UNITED STATES PATENT OFFICE.

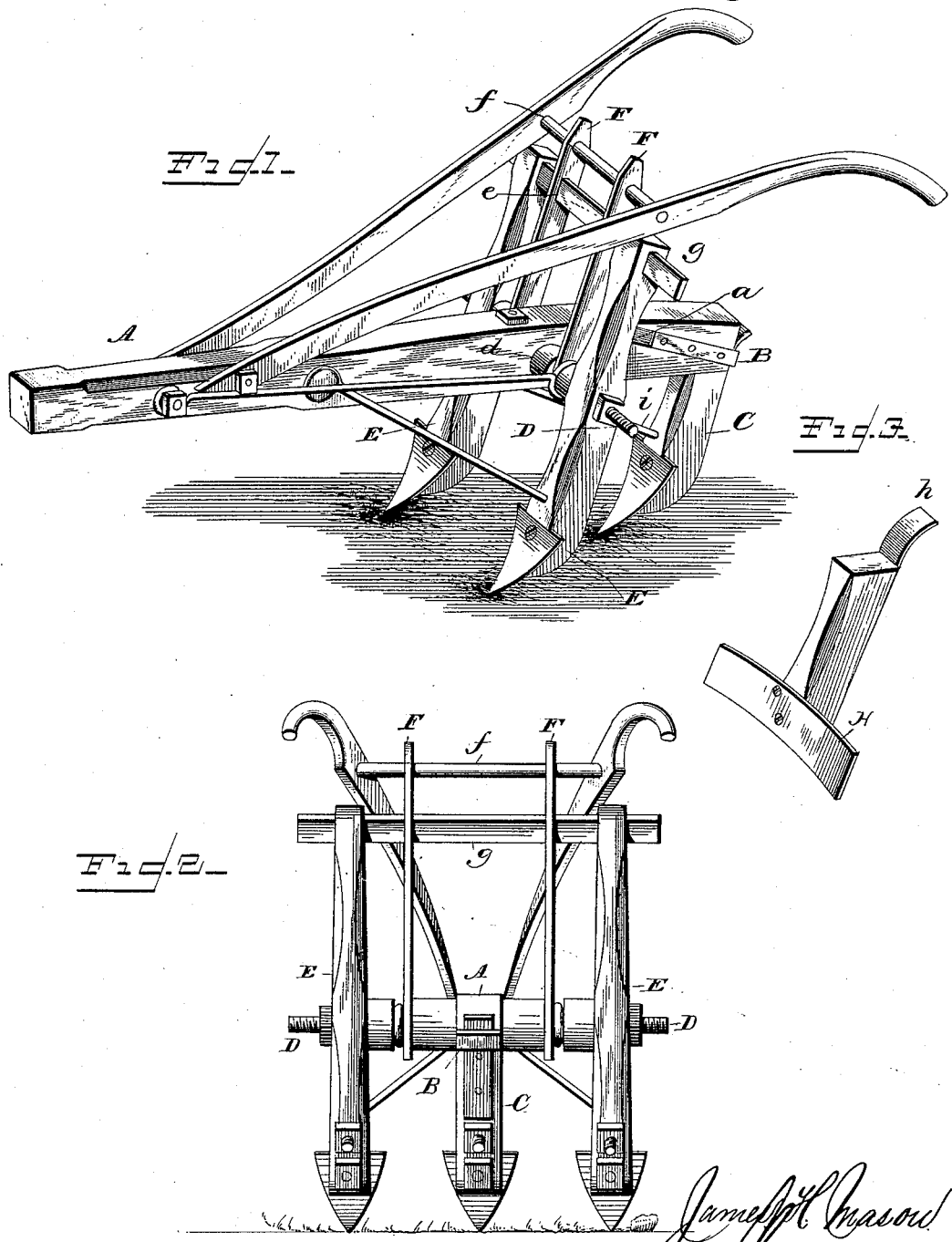

JAMES HARRISON MASON, OF SPRINGFIELD, ARKANSAS, ASSIGNOR OF ONE-HALF TO ALEXANDER B. SIMMONS, OF SAME PLACE.

CULTIVATOR.

SPECIFICATION forming part of Letters Patent No. 347,725, dated August 17, 1886.

Application filed April 22, 1886. Serial No. 199,820. (No model.)

*To all whom it may concern:*

Be it known that I, JAMES HARRISON MASON, a citizen of the United States of America, residing at Springfield, in the county of Conway and State of Arkansas, have invented certain new and useful Improvements in Cultivators; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in cultivators, the object of the same being to provide an implement in which the side plows or cultivators can be adjusted laterally and the rear one removed, as will be hereinafter fully set forth.

In the accompanying drawings, Figure 1 is a perspective view of a cultivator constructed in accordance with my improvement; Fig. 2, an end view; and Fig. 3 is a detail perspective view.

A refers to the plow-beam, the rear end of which is provided on each side with inclined recesses a, within which lie the terminal portions of a strap or bail, B, the bent portion of said strap projecting beyond the plow-beam, as shown, so as to provide a loop within which a projecting portion attached to the rear standards, C, may be inserted.

D refers to a transverse bar, which extends through the plow-beam and projects on each side of the same. Upon this bar D are located a suitable number of washers, d, which can be removed for adjusting the plow-standards E E laterally.

F F refer to upright pieces, through the lower ends of which the transverse bar D passes. The upper ends of said bars are secured to the bar f, which connects the handles to each other, and under said handles these bars F F are provided with slots e, within which is secured a brace, g, upon which the upper ends of the standard E slide.

By the means hereinbefore described the standards E E and the plows attached thereto may be adjusted laterally. The rear standard, C, has attached at its rear upper end a curved plate, h, which may be inserted under the loop B, and said standard, when placed in position, is held secure by a brace-rod, i, which extends through the same and is attached to the plow-beam by a bolt.

When it is desired to use the implement as a cultivator, a shovel, or plow similar in construction to those employed on the forward standards is attached to the rear standard, C, as shown in Figs. 1 and 2.

In cultivating between rows the rear standard may be removed entirely from the plow-beam, and when desired a coverer, H, as shown in Fig. 3, for throwing the dirt over seeds which may have been previously planted, may be attached to the movable standard C.

I claim—

The combination, in a cultivator, of the beam A, rod D, passing through the same and provided with spacing-washers, standards E E, mounted on said rod, and fastening-nuts, a loop, B, located on the rear end of the said beam, a standard, C, having its upper end bearing against the beam, and having a curved plate, h, to engage said loop, and a tie-rod, i, substantially as set forth.

In testimony whereof I affix my signature in presence of two witnesses.

JAMES HARRISON MASON.

Witnesses:
H. P. WILLBANKS,
C. E. HAWKINS.